(12) United States Patent
Furness et al.

(10) Patent No.: US 8,782,430 B2
(45) Date of Patent: Jul. 15, 2014

(54) SECURE EXTERNAL BUFFER FOR HARD DISK DRIVE SYSTEM ON A CHIP

(75) Inventors: Duncan Furness, Boulder, CO (US); Francesco Brianti, San Jose, CA (US); David Tamagno, Boulder, CO (US)

(73) Assignee: STMicroelectronics, Inc., Coppell, TX (US)

(*) Notice: Subject to any disclaimer, the term of this patent is extended or adjusted under 35 U.S.C. 154(b) by 801 days.

(21) Appl. No.: 12/692,348

(22) Filed: Jan. 22, 2010

(65) Prior Publication Data
US 2010/0185848 A1    Jul. 22, 2010

Related U.S. Application Data

(60) Provisional application No. 61/146,556, filed on Jan. 22, 2009.

(51) Int. Cl.
*G06F 21/00* (2013.01)

(52) U.S. Cl.
USPC ........... 713/189; 713/153; 713/185; 726/2; 726/3; 726/9; 726/26

(58) Field of Classification Search
CPC .................................................... G06F 21/85
USPC .............................. 713/153, 189; 380/43, 44
See application file for complete search history.

(56) References Cited

U.S. PATENT DOCUMENTS

| | | | |
|---|---|---|---|
| 6,104,810 A * | 8/2000 | DeBellis et al. | 380/43 |
| 6,108,812 A | 8/2000 | Born | |
| 7,269,844 B2 * | 9/2007 | Elteto et al. | 726/2 |
| 7,386,734 B2 | 6/2008 | Wann et al. | |
| 2004/0107340 A1 * | 6/2004 | Wann et al. | 713/153 |
| 2005/0097315 A1 * | 5/2005 | Carmeli | 713/160 |
| 2005/0289262 A1 | 12/2005 | Sutardja | |

OTHER PUBLICATIONS

"Design and Implementation of a Scalable Encryption Processor with Embedded Variable DC/DC Converter"; Goodman et al; DAC 99, New Orleans, Louisiana (c) 1999 ACM.*

* cited by examiner

*Primary Examiner* — Jason Lee
(74) *Attorney, Agent, or Firm* — Hogan Lovells US LLP

(57) ABSTRACT

A system securely buffers hard disk drive data using a host side eXlusive OR (XOR) encryption engine. A host communicates with an encryption interface interposed between the host and a client. Communicatively coupled to the encryption interface is an external buffer for the collection and processing of data. A host side XOR encryption engine, using a random seed, encrypts data originating from the host and places it on the external buffer. Once collected at the buffer and ready for transmittal to the client, the encrypted data is retrieved by the encryption interface and decrypted using the same random seed. The clear data is then encrypted once again using a robust encryption means such as Advance Encryption Standard (AES) encryption by a client side device for conveyance to the client.

16 Claims, 3 Drawing Sheets

SECURE EXTERNAL BUFFER FOR HARD DISK DRIVE SYSTEM ON A CHIP

RELATED APPLICATION

The present application relates to and claims the benefit of priority to U.S. Provisional Patent Application No. 61/146,556 filed Jan. 22, 2009, which is hereby incorporated by reference in its entirety for all purposes as if fully set forth herein.

BACKGROUND OF THE INVENTION

1. Field of the Invention

Embodiments of the present invention relate, in general, to secure data transfer to hard disk drives using a System on a Chip (SoC) and more particularly to securing data on an external buffer associated with a SoC using an eXclusive Or (XOR) encryption methodology.

2. Relevant Background

Host devices such as computers, laptops, personal digital assistants, MP3 players, game consoles, set top boxes, digital cameras and other electronic devices often need to store and access large amounts of data. Storage devices such as hard disk drives (HDD) are often used to meet the data storage needs of such devices. The transfer and storage of data dates back to the origination of the computer. Where and how do you store the programs, data and calculations? Over the years the answers to those questions have resulted in faster and more capacious methods of mass storage. There are numerous concepts to consider in the transfer and storage of data. These include access time, data transfer rate, formatting, compression and more. Many of these questions with respect to data storage and transfer have been resolved on a single chip referred to as a SoC. With respect to data storage, a SoC takes data from a host such as a computer and delivers it to a storage media such as a hard disk drive. One issue to address in the storage of data is that the production of data from a host is rarely continuous or consistent. It would be inefficient to convey data to a storage medium as it arrives from the host. Thus one function of a SoC is to collect data until it is ready to be stored. This collection occurs in a buffer.

FIG. 1 shows an exemplary version of a HDD SoC as would be known to one skilled in the relevant art. The HDD SoC 112 is interposed between a host 146 and a hard disk assembly (HDA) 113. The HDA 113 in this rendition includes a disk platter 114 that is coated with magnetic material 115 and which revolves around and is driven by a spindle motor 116. Generally the spindle motor 116 rotates the platter 114 at a fixed speed during read/write operations as an actuator 118 moves a read/write device 120 over the platter 114 to read/write the data.

The read/write device 120 is located at the distal end of the actuator arm 118 and includes a write element such as an inductor that can generate a magnetic field as well as a read element such as a magnetic-resistive element that can sense a magnetic field present on the platter 114. A preamp circuit 122 amplifies the low level signals from the read element and outputs the data to a read channel 124 located on the HDD SoC 112.

When data is written to the platter 114 a current is generated so as to flow to the read/write device 120. The current is switched, forming a magnetic field which is adopted by the platter 114 and represents data.

The HDD SoC 112 typically includes a buffer 132 linked to the hard disk controller 136. The buffer 132 of the HDD SoC 112 and/or other external memory resources can be (as illustrated in FIG. 1) external to the SoC 112 and linked to the HDC 136 to increase capacity. The buffer 132 stores data associated with the control of the hard disk drive and/or buffers data to allow data to be collected and transmitted as larger blocks so as to improve efficiency. Data stored on an external memory resource must be secure, i.e. external data resources cannot possess data stored in the clear. As is well known to one skilled in the relevant art, data stored on external buffers 132 are generally encrypted using an encryption engine 135.

As one skilled in the art will appreciate, many robust encryption techniques can be used to secure data. The HDD SoC 112 also includes a processor 134 that performs any necessary processing related to the operation of the HDD including that of the hard disk controller 136 and encryption component 135. The hard disk controller 136 communicates with the host device 146 via a HDD interface 136 and the host interface 144.

This encryption engine is generally associated with the host device 146 meaning that upon every read or write command issued by the host 146, the data is first processed by the encryption engine prior to being placed on the buffer 132. Thereafter the data is collected and eventually transferred to the storage device. Data being retrieved from the HDA 113 is collected on the buffer and thereafter decrypted by the encryption engine before transfer to the host. This interaction amongst the host 146, buffer 132 and storage media (client) adds complexity to the HDD SoC 112. In one example an external buffer 132 with a host side encryption scheme has been shown to add 1.4 Mega Gates (MG) to a typical SoC to ensure that data kept on an external buffer remains secure.

One encryption scheme used in this example is a Feistel network-based cipher designed for use with digital data. The cipher is very robust and efficient when implemented in software or, when small, when implemented in hardware. The two primary components of a cipher are the cipher itself (usually positioned on the host) and media key blocks comprising cryptographic values that implement broadcast key distribution and provide renewability in content protection solutions. However the robustness of the cipher increases the complexity of the SoC architecture. Indeed while data housed external to the SoC must be secure, a robust cipher needlessly adds excess complexity to the SoC without providing compensatory security advantages.

A system and associated methodology for securely interfacing with an external memory buffer from a SoC without the added complexity of current encryption techniques is therefore desirable. These and other improvements of the prior art are addressed by one or more embodiments of the present invention as described hereafter by way of example.

SUMMARY OF THE INVENTION

A system for securely buffering hard disk drive data using a host side XOR encryption engine is hereafter described by way of example. According to one embodiment of the present invention, a host communicates with an encryption interface interposed between the host and a client. Communicatively coupled to the encryption interface is an external buffer for the collection and processing of data. According to one embodiment of the present invention, a host side XOR encryption engine, using a random seed, encrypts data originating from the host and places it on the external buffer. Once collected at the buffer and ready for transmittal to the client, the encrypted data is retrieved by the encryption interface and decrypted. The clear data is then encrypted using a robust encryption means such as Advance Encryption Standard encryption for conveyance to the client.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

As previously described, incorporating a host side encryption scheme to secure data held on an external buffer significantly adds to the complexity of a SoC. It is one object of the present invention to reduce the complexity of a SoC and thereby reduce the number of gates on the chip by modifying the buffered encryption scheme. Traditionally, and as known in the prior art, data coming from the host is secured via a robust encryption scheme prior to being placed on the buffer. Thus the encryption is on the host side of the SoC rather than on the client side.

According to one embodiment of the present invention, data is secured on the buffer via a simple eXclusive OR (XOR) encryption scheme rather than a robust host side encryption scheme as used in the prior art. The data is encrypted using a unique encryption seed which is rest on each power cycle or power-on-reset (POR). Prior to being delivered to the client the XOR encrypted data is retrieved from the buffer, decrypted using the same seed and thereafter encrypted using a robust encryption technique such as an Advanced Encryption Standard (AES) scheme.

Figure 1:
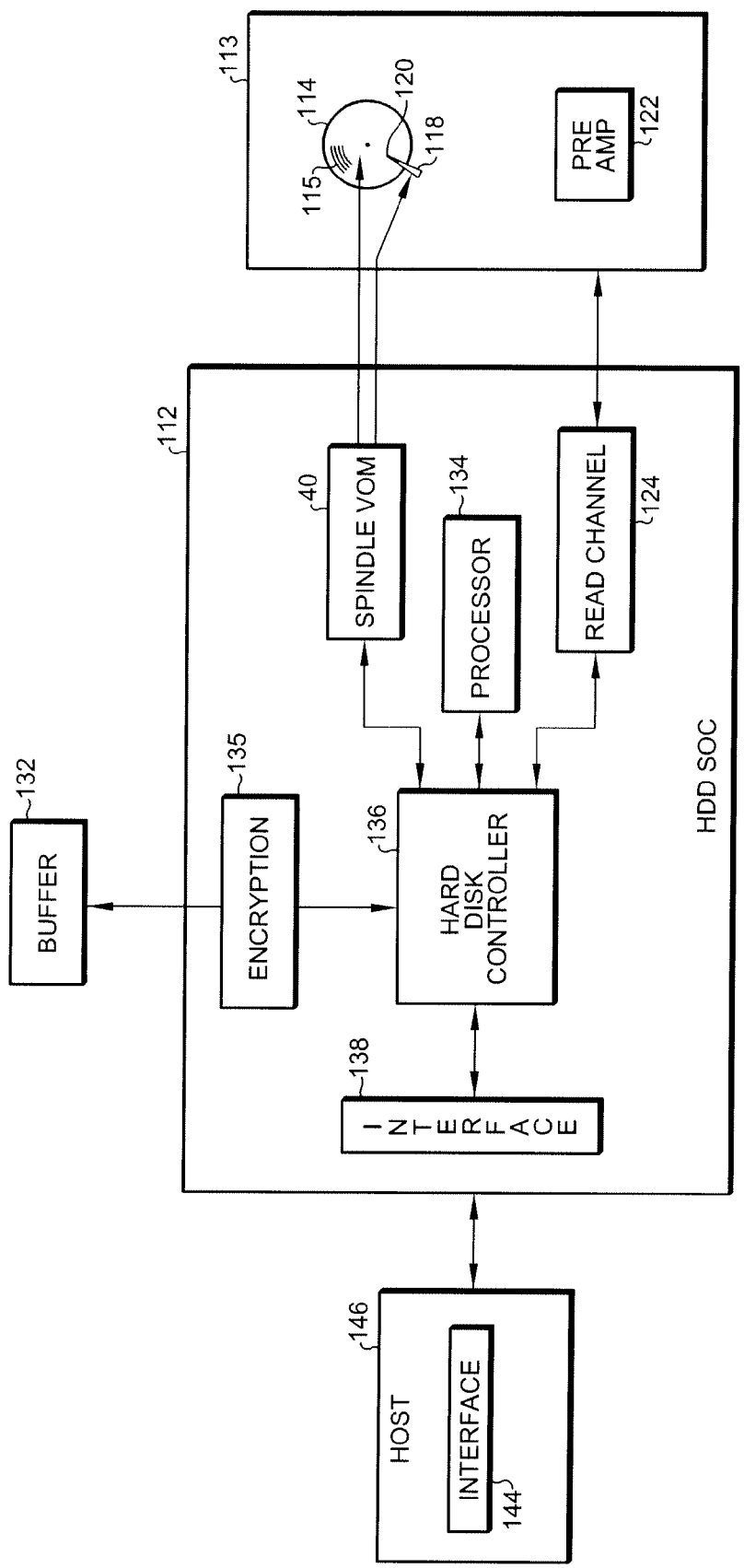
FIG. 1 shows hard disk drive SoC configuration with an external buffer as known to one skilled in the art.
Figure 2:
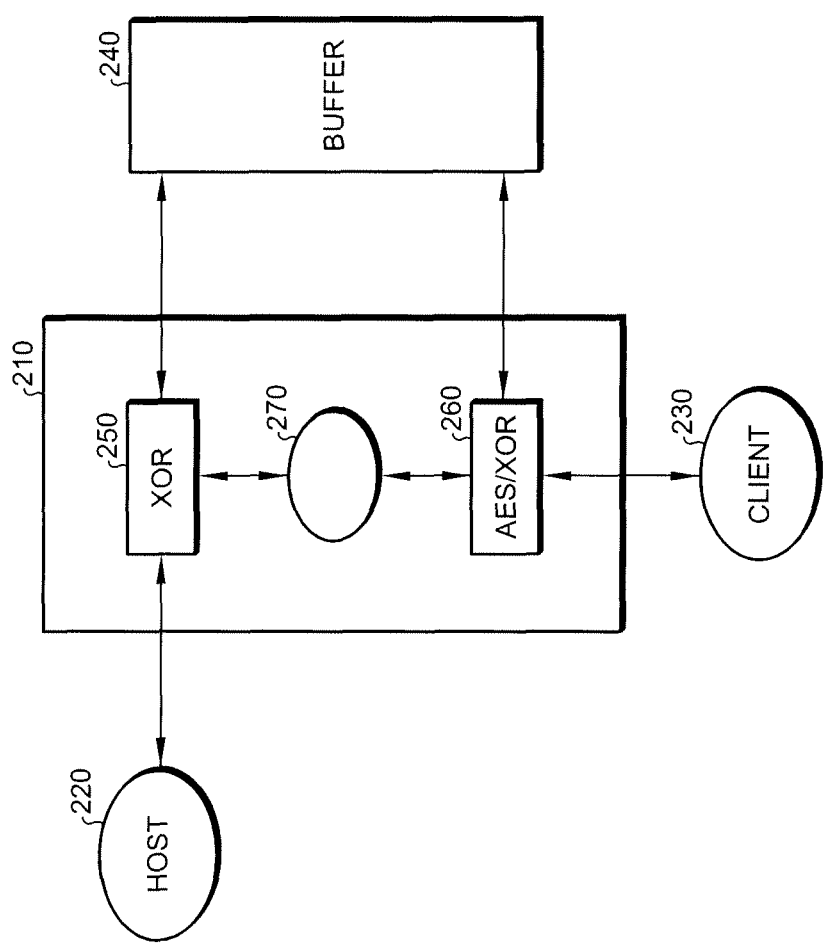
FIG. 2 is a high level block diagram of an encryption interface interposed between a host and a client using a XOR encryption engine to securely buffer data according to one embodiment of the present invention.

FIG. 2 is a high level block diagram of a simplified SoC system for buffering secure data according to one embodiment of the present invention. A SoC 210 is interposed between a host 220 and a client 230. In general a host device 220 can be a desktop or notebook computer, microprocessor, router, interface card, or any other device capable of generating data. The client 230 may be a data storage device, disk drive, tape drive, floppy drive, magnetic optical drive, digital video recorder, slash memory card, PCMCIA card, transmitter/receiver, or any other device capable of receiving, transmitting or storing data.

An external buffer 240 is communicatively coupled to the SoC 210. The SoC 210 further includes a XOR encryption engine 250, a AES/XOR encryption-decryption engine 260 and a microprocessor 270. The XOR encryption engine and the AES/XOR encryption-decryption engine 260 are communicatively coupled to the microprocessor 270 for command, sequencing and management processing. The XOR encryption engine 250 is a host side device and interposed between the host 220 and the buffer 240.

As data is delivered from the host 220 and directed to the client 230 the XOR encryption engine 250 of the SoC 210 encrypts the data using a XOR encryption scheme and a seed randomly generated by the microprocessor 270. The logical operation exclusive disjunction (symbolized XOR), is a type of logical disjunction on two operands that results in a value of true if exactly one of the operands has a value of true. A simple way to state this is "one or the other but not both." Put differently, exclusive disjunction is a logical operation on two logical values, typically the values of two propositions, that produces a value of true only in cases where the truth value of the operands differ.

In cryptography, the simple XOR cipher is a simple encryption algorithm that operates according to the principles:

$$A \oplus 0 = A,$$

$$A \oplus A = 0,$$

$$(B \oplus A) \oplus A = B \oplus 0 = B,$$

where $\oplus$ denotes the XOR operation. With this logic, a string of text can be encrypted by applying the bitwise XOR operator to every character using a given key. To decrypt the output, merely reapplying the key (seed) will remove the cipher.

For example, the string 01010111 01101001 01101011 01101001 (in 8-bit ASCII) can be encrypted with the key 11110011 as follows:

$$\oplus = \frac{01010111 \quad 01101001 \quad 01101011 \quad 01101001}{\underline{11110011 \quad 11110011 \quad 11110011 \quad 11110011}}$$
$$10100100 \quad 10011010 \quad 10011000 \quad 10011010$$

And conversely, for decryption:

$$\oplus = \frac{10100100 \quad 10011010 \quad 10011000 \quad 10011010}{\underline{11110011 \quad 11110011 \quad 11110011 \quad 11110011}}$$
$$01010111 \quad 01101001 \quad 01101011 \quad 01101001$$

The XOR operator is extremely common as a component in more complex ciphers. By itself, using a constant repeating key, a simple XOR cipher can trivially be broken using frequency analysis. If the content of any message can be guessed or otherwise known then the key can be revealed. The XOR scheme's primary merit is that it is simple to implement, and its operation is computationally inexpensive. A simple repeating XOR cipher is therefore sometimes used for hiding information in cases where no particular security is required.

However, if the key is random and is as long as the message (so it never repeats), the XOR cipher is more secure. When a key stream is generated by a pseudo-random number generator, the result is a stream cipher. With a key that is truly random, the result is a one-time pad, which is unbreakable even in theory.

The AES/XOR encryption-decryption engine 260 is a client side device interposed between the buffer 240 and the client 230. The client side encryption engine can, according to other embodiments of the present invention, encrypt/decrypt data in several standard pipeline stages using various known cryptographic algorithms such as AES, Data Encryption Standard (DES) and Triple DES. Other types of cipher engines and/or cryptographic algorithms may also be utilized and are contemplated in practicing the invention.

In cryptography, AES is an encryption standard adopted by the U.S. government with respect to the transfer of data. The standard comprises three block ciphers, AES-128, AES-192 and AES-256, adopted from a larger collection. Each AES cipher has a 128-bit block size, with key sizes of 128, 192 and 256 bits, respectively. The AES ciphers have been analyzed extensively and are now used worldwide, as was the case with its predecessor, DES.

AES was announced by National Institute of Standards and Technology (NIST) as U.S. FIPS PUB 197 (FIPS 197) on Nov. 26, 2001 after a 5-year standardization process in which fifteen competing designs were presented and evaluated (see Advanced Encryption Standard process for more details). It became effective as a Federal government standard on May 26, 2002 after approval by the Secretary of Commerce. It is available in many different encryption packages. AES is the first publicly accessible and open cipher approved by the NSA for top secret information.

AES is based on a design principle known as a substitution permutation network. It is fast in both software and hardware and, unlike its predecessor, DES, AES does not use a Feistel network. AES operates on a 4×4 array of bytes, termed the state; and most of AES calculations are done in a special finite field. The AES cipher is specified as a number of repetitions of transformation rounds that convert the input plaintext into the final output of ciphertext. Each round consists of several processing steps, including one that depends on the encryption key. A set of reverse rounds is applied to transform ciphertext back into the original plaintext using the same encryption key.

Figure 3:
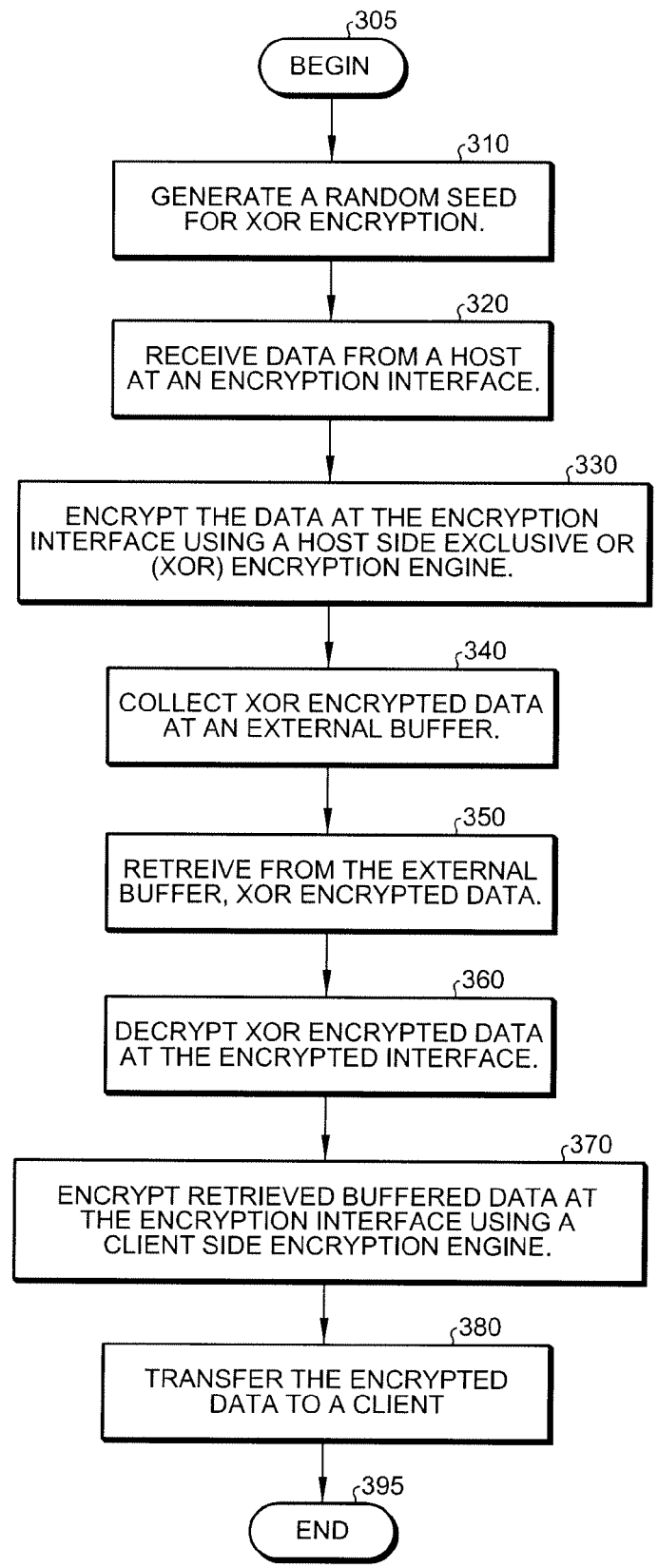
FIG. 3 is a flowchart of one method embodiment for securely buffering data using a XOR encryption engine according to the present invention.

FIG. 3 is a flowchart showing one method embodiment for the secure buffering of data in a SoC environment according to the present invention. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

The process begins 305 at power up, or upon a reset, with the generation 310 of a random seed via a random number generator for use by the XOR encryption engine. Thereafter data is received 320 from a host at an encryption interface or SoC. The data is then directed to a host side XOR encryption engine where, using the seed, the data is encrypted 330 by the XOR encryption engine and delivered to a buffer for storage.

The buffer collects 340 XOR encrypted data until a state is achieved in which the data can be efficiently conveyed to a client such as via a hard disk drive assembly or transmitter/receiver. Once enough data has been collected in the buffer to be conveyed to the client it is retrieved 350 by the SoC (encryption interface) and decrypted 360 using the same random seed. Recall that the data stored on the buffer was encrypted using a XOR encryption scheme and the random seed.

The data, not in clear text, is once again encrypted 370 using this time an AES or similar robust encryption technique by a client side encryption engine. Once encrypted the data is transferred 380 to the client ending 395 the process.

In a like manner data can be retrieved from a hard disk drive by reversing the above process. Data being retrieved from a storage media or other type of client is first decrypted by the AES encryption engine and then encrypted using the XOR encryption technique and placed on the buffer. All data retained on the external buffer is therefore XOR encrypted data and retrievable using a secure random seed. Once data has been collected in the buffer as controlled by the processor on the SoC, the data is delivered to the host side XOR encryption engine for decryption and delivery to the host.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a secure external buffer for a SoC, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A circuit for secure data transfer, comprising:
   a host;
   a client;
   a cryptographic interface operatively coupled to, and interposed between, the host and the client; and
   an external buffer operatively coupled to the cryptographic interface wherein the cryptographic interface includes a host side eXclusive OR (XOR) encryption engine operable to encrypt/decrypt data to/from the external buffer and a microprocessor operable for cryptographic processing and for generating a random seed, wherein the random seed is generated upon each power-on-reset.

2. The circuit for data transfer of claim 1 wherein the cryptographic interface includes a client side encryption engine operable to decrypt the XOR encrypted data from the external buffer and encrypt/decrypt data to/from the client using the client side encryption engine.

3. The circuit for data transfer of claim 2 wherein the client side encryption engine is an Advanced Encryption Standard (AES) encryption engine.

4. The circuit for data transfer of claim 1 wherein the cryptographic interface is a system-on-a-chip (SoC).

5. The circuit for data transfer of claim 1 wherein data stored on the external buffer is XOR protected data.

6. The circuit for data transfer of claim 1 wherein the client is a data storage device.

7. The circuit for data transfer of claim 6 wherein the data storage device is a hard disk drive.

8. The circuit for data transfer of claim 1 wherein the client is a data transmitter/receiver.

9. A method for securely transferring data, comprising:
   receiving data from a host at an encryption interface including a microprocessor operable for cryptographic processing and for generating a random seed, wherein the random seed is generated at each power-on-reset;
   encrypting the data at the encryption interface using a host side eXclusive OR (XOR) encryption engine;
   collecting XOR encrypted data on an external buffer;
   decrypting the XOR encrypted data from the external buffer at the encryption interface;
   encrypting decrypted XOR data at the encryption interface using a client side encryption engine; and
   transferring the encrypted data to a client.

10. The method of claim 9 wherein the client side encryption engine is operable to encrypt and decrypt data being transmitted and received to and from a client.

11. The method of claim 9 wherein the client is a data storage device.

12. The method of claim 11 wherein the data storage device is a hard disk drive.

13. The method of claim 9 wherein the client is a receiver/transmitter.

14. The method of claim 9 wherein the encryption interface is a system-on-a-chip (SoC).

15. A non-transitory computer-readable storage medium tangibly embodying a program of instructions executable by a machine wherein said program of instructions comprises a plurality of program codes for buffering secure hard disk drive data, said program of instructions comprising:
   program code for an eXclusive OR (XOR) encryption engine in an encryption interface including a microprocessor operable for cryptographic processing and for generating a random seed, wherein the random seed is generated upon each power-on-reset;
   program code for encrypting host side data using the XOR encryption engine; and
   program code for buffering on an external buffer XOR encrypted data.

16. The non-transitory computer-readable storage medium of claim 15 embodying a program of instructions executable wherein said program of instructions further includes:
   program code for decrypting XOR encrypted data from the external buffer,
   program code for encrypting decrypted XOR encrypted data using an Advanced Encryption Standard (AES) encryption scheme; and
   program code for transferring the XOR and AES encrypted data to a client.

* * * * *